United States Patent
Nakatsugawa

[11] Patent Number: 6,141,354
[45] Date of Patent: Oct. 31, 2000

[54] DATA TRANSMITTER, DATA RECEIVER, DATA COMMUNICATION SYSTEM, DATA TRANSMITTING METHOD, DATA RECEIVING METHOD, AND DATA COMMUNICATING METHOD

[75] Inventor: Yoshinori Nakatsugawa, Susono, Japan

[73] Assignee: Yazaki Corporation, Tokyo, Japan

[21] Appl. No.: 08/986,418

[22] Filed: Dec. 8, 1997

[30] Foreign Application Priority Data

Dec. 6, 1996 [JP] Japan .................................. 8-327016

[51] Int. Cl.[7] ........................................ H04J 3/22
[52] U.S. Cl. .............................. 370/465; 709/233
[58] Field of Search ............................. 370/465, 466, 370/468, 503, 507; 709/227, 228, 237, 248, 230, 232, 233; 364/239.1, 240.3

[56] References Cited

U.S. PATENT DOCUMENTS

| | | | |
|---|---|---|---|
| 5,586,151 | 12/1996 | Minigawa | 375/377 |
| 5,726,765 | 3/1998 | Yoshida et al. | 358/412 |
| 5,796,808 | 8/1998 | Scott et al. | . |
| 5,822,367 | 10/1998 | Koshino | 375/222 |
| 5,901,191 | 5/1999 | Ohno | 375/377 |
| 5,938,731 | 8/1999 | Schreiter | 709/227 |
| 5,999,563 | 12/1999 | Polley et al. | 375/222 |
| 6,002,722 | 12/1999 | Wu | 375/295 |

FOREIGN PATENT DOCUMENTS

| | | |
|---|---|---|
| 61-102839 | 5/1986 | Japan . |
| 62-107475 | 5/1987 | Japan . |
| 64-90628 | 4/1989 | Japan . |

*Primary Examiner*—Ricky Ngo
*Attorney, Agent, or Firm*—Oblon, Spivak, McClelland, Maier & Neustadt, P.C.

[57] ABSTRACT

A first speed switching portion switches a transfer speed of digital data on a transmitter side into a predetermined transfer speed. A first command transmitter/receiver transmits to a receiver side a speed switching command which makes switch a transfer speed of the digital data on a receiver side into a transfer speed which coincides with the predetermined transfer speed. A source data reader transmits the digital data to the receiver side at the predetermined transfer speed after the transfer speed of the digital data on the receiver side has been switched into the transfer speed which coincides with the predetermined transfer speed. A second speed switching portion switches the transfer speed of the digital data on the receiver side into the predetermined transfer speed in compliance with the speed switching command which is transmitted from the transmitter side. A second command transmitter/receiver informs the transmitter side of an end of switching after the transfer speed of the digital data on the receiver side has been switched into the predetermined transfer speed. An image memory receives the digital data transmitted from the transmitter side at the predetermined transfer speed after the transmitter side has been informed of the end of switching.

23 Claims, 5 Drawing Sheets

DATA TRANSMITTER, DATA RECEIVER, DATA COMMUNICATION SYSTEM, DATA TRANSMITTING METHOD, DATA RECEIVING METHOD, AND DATA COMMUNICATING METHOD

BACKGROUND OF THE INVENTION

1. Field of the Invention

The present invention relates to a data transmitter, a data receiver, a data communication system, a data transmitting method, a data receiving method and a data communicating method, capable of transferring surely digital data such as image, sound, character, etc. being stored in an information storing medium such as CD-ROM from a transmitter side to a receiver side at a predetermined transfer speed.

2. Description of the Prior Art

In recent years, various information reproducing devices for reproducing digital data such as character, sound, image, etc. stored in an information storing medium such as CD (Compact Disc), CD-ROM, etc. have been rapidly spread.

In particular, for example, in a CD-ROM drive which can play the digital data stored in the CD-ROM, a higher data transfer speed is pushed forward in answer to the request to play smoothly multimedia soft such as music, moving picture, etc. This higher data transfer speed can be achieved as an integral multiple of a standard speed of 1.4 Mbps which is a data transfer speed of a music CD player.

In the above situation that the higher data transfer speed is pushed forward day after day, there have been on the market various CD-ROM drives which can play the digital data in mutually different tuple speed modes such as double speed, treble speed, quadruple speed, octuple speed, nonuple speed, etc. according to plural standards respectively.

However, in such situation that the CD-ROM drives which are operated in mutually different tuple speed modes according to plural standards have been brought to the market, there has been a drawback to be overcome that there is a possibility of bringing about such a situation that the digital data which are reproduced at a tuple speed mode, e.g., octuple speed, peculiar to a certain CD-ROM drive and then transmitted therefrom at a predetermined transfer speed cannot be received by an image reproducing unit on the receiver side, for example.

The above situation has occurred in the event that the data transfer speed on the receiver side does not coincide with the data transfer speed on the transmitter side. In order not to bring about such situation, there has been such a disadvantage for the user of the CD-ROM drive in expanding the user's system that not only the user has to prepare another receiver side device which is able to receive the digital data at the transfer speed corresponding to the tuple speed mode of his or her own CD-ROM drive, but also the user has to newly introduce another transmitter side device having a different tuple speed mode into the user's system after an image reproducing system has been constructed by combining the CD-ROM drive as the transmitter side device with the image reproducing unit as the receiver side device, for instance.

SUMMARY OF THE INVENTION

The present invention has been made in light of the above circumstances, and it is an object of the present invention to provide a data transmitter, a data receiver, a data communication system, a data transmitting method, a data receiving method and a data communicating method, capable of transferring firmly digital data such as character, sound, image, etc. which are stored in an information storing medium such as CD-ROM, for example, from a transmitter side to a receiver side after a coincidence of data transfer speeds on the transmitter side and the receiver side has been accomplished.

In order to achieve the above object, according to a first aspect of the present invention, there is provided a data transmitter comprising: transmitter side speed switching means for switching a transfer speed of digital data on a transmitter side into a predetermined transfer speed; data transmitting means for transmitting the digital data at the predetermined transfer speed; and speed switching command transmitting means for transmitting to a receiver side a speed switching command which makes switch a transfer speed of the digital data on the receiver side into a transfer speed which coincides with the predetermined transfer speed; wherein the data transmitting means transmits the digital data to the receiver side at the predetermined transfer speed after the transfer speed of the digital data on the receiver side has been switched into the transfer speed which coincides with the predetermined transfer speed.

According to the present invention, the transmitter side speed switching means switches the transfer speed of the digital data on the transmitter side into a predetermined transfer speed, the speed switching command transmitting means transmits to the receiver side the speed switching command which makes switch the transfer speed of the digital data on the receiver side into the transfer speed which coincides with the predetermined transfer speed, and the data transmitting means transmits the digital data to the receiver side at the predetermined transfer speed after the transfer speed of the digital data on the receiver side has been switched into the transfer speed which coincides with the predetermined transfer speed. Hence, after the coincidence between data transfer speeds on the transmitter side and the receiver side has been accomplished, the digital data can be transmitted surely from the transmitter side to the receiver side.

In the preferred embodiment of the present invention, the speed switching command transmitting means receives, from receiver side, speed switching-end information informing that the transfer speed of the digital data on the receiver side has been switched into the transfer speed which coincides with the predetermined transfer speed.

In the preferred embodiment of the present invention, the data transmitting means transmits the digital data as audio data based on CEI/IEC-958 standard in which one frame of 64 bits is constructed by two subframes made up of right and left channels.

In the preferred embodiment of the present invention, the speed switching command transmitting means writes the speed switching command into user data areas in the subframes made up of right and left two channels, and then transmits subframes to the receiver side.

In the preferred embodiment of the present invention, the data transmitting means transmits the digital data via a bus system data transfer line.

In order to achieve the above object, according to a second aspect of the present invention, there is provided a data receiver comprising: receiver side speed switching means for switching a transfer speed of digital data on a receiver side into a predetermined transfer speed in compliance with a speed switching command which is transmitted from a transmitter side; data receiving means for receiving the digital data at the predetermined transfer speed which has been switched by the receiver side speed switching means; and speed switching-end informing means for informing the transmitter side of an end of switching after the transfer speed of the digital data on the receiver side has been switched into the predetermined transfer speed in compliance with the speed switching command by the receiver side speed switching means; wherein the data receiving means receives the digital data which are transmitted from the transmitter side at the predetermined transfer speed after the speed switching-end informing means has informed the transmitter side of the end of switching.

According to the present invention, first the receiver side speed switching means switches the transfer speed of the digital data on the receiver side into the predetermined transfer speed in compliance with the speed switching command which is transmitted from the transmitter side, the speed switching-end informing means informs the transmitter side of the end of switching after the transfer speed of the digital data on the receiver side has been switched into the predetermined transfer speed, and the data receiving means receives the digital data transmitted from the transmitter side at the predetermined transfer speed after the transmitter side has been informed of the end of switching. Hence, after the coincidence between data transfer speeds on the transmitter side and the receiver side has been accomplished, the digital data transmitted from the transmitter side can be received surely by the receiver side.

In the preferred embodiment of the present invention, the data receiving means receives the digital data as audio data based on CEI/IEC-958 standard in which one frame of 64 bits is constructed by two subframes made up of right and left channels.

In the preferred embodiment of the present invention, the receiver side speed switching means switches the transfer speed of the digital data on the receiver side into the predetermined transfer speed in compliance with the speed switching command which is written into user data areas in the subframes made up of right and left two channels.

In the preferred embodiment of the present invention, the data receiving means receives the digital data via a bus system data transfer line.

In order to achieve the above object, according to a third aspect of the present invention, there is provided a data communication system comprising: transmitter side speed switching means for switching a transfer speed of digital data on a transmitter side into a predetermined transfer speed; data transmitting means for transmitting the digital data at the predetermined transfer speed; speed switching command transmitting means for transmitting to a receiver side a speed switching command which makes switch a transfer speed of the digital data on the receiver side into a transfer speed which coincides with the predetermined transfer speed; receiver side speed switching means for switching the transfer speed of the digital data on the receiver side into the predetermined transfer speed in compliance with the speed switching command which is transmitted by speed switching command transmitting means; data receiving means for receiving the digital data at the predetermined transfer speed which has been switched by the receiver side speed switching means; and speed switching-end informing means for informing the transmitter side of an end of switching after the transfer speed of the digital data on the receiver side has been switched into the predetermined transfer speed in compliance with the speed switching command by the receiver side speed switching means; wherein the data transmitting means transmits the digital data to the receiver side at the predetermined transfer speed after the transfer speed of the digital data on the receiver side has been switched into the transfer speed which coincides with the predetermined transfer speed, and wherein the data receiving means receives the digital data which are transmitted from the transmitter side at the predetermined transfer speed after the speed switching-end informing means has informed the transmitter side of the end of switching.

According to the present invention, at first the transmitter side speed switching means switches the transfer speed of the digital data on the transmitter side into a predetermined transfer speed, the speed switching command transmitting means transmits to the receiver side the speed switching command which makes switch the transfer speed of the digital data on the receiver side into the transfer speed which coincides with the predetermined transfer speed, and the data transmitting means transmits the digital data to the receiver side at the predetermined transfer speed after the transfer speed of the digital data on the receiver side has been switched into the transfer speed which coincides with the predetermined transfer speed.

In addition, the receiver side speed switching means switches the transfer speed of the digital data on the receiver side into the predetermined transfer speed in compliance with the speed switching command which is transmitted from the transmitter side, the speed switching-end informing means informs the transmitter side of the end of switching after the transfer speed of the digital data on the receiver side has been switched into the predetermined transfer speed, and the data receiving means receives the digital data transmitted from the transmitter side at the predetermined transfer speed after the transmitter side has been informed of the end of switching.

Hence, after the data transfer speeds on the transmitter side and the receiver side have been brought into coincidence with each other, the digital data can be transferred surely from the transmitter side to the receiver side.

In the preferred embodiment of the present invention, the data transmitting means and the data receiving means transmits and receives respectively the digital data as audio data based on CEI/IEC-958 standard in which one frame of 64 bits is constructed by two subframes made up of right and left channels.

In the preferred embodiment of the present invention, the speed switching command transmitting means writes the speed switching command into user data areas in the subframes made up of right and left two channels and then transmits the subframes to the receiver side, and the receiver side speed switching means switches the transfer speed of the digital data on the receiver side into the predetermined transfer speed in compliance with the speed switching command which is written into the user data areas.

In the preferred embodiment of the present invention, the data transmitting means and the data receiving means transmits and receives the digital data via a bus system data transfer line respectively.

In order to achieve the above object, according to a fourth aspect of the present invention, there is provided a data transmitting method comprising the steps of: switching a transfer speed of digital data on a transmitter side into a predetermined transfer speed; transmitting a speed switching command which makes switch a transfer speed of the digital data on a receiver side into a transfer speed which coincides with the predetermined transfer speed; and transmitting the digital data to the receiver side at the predetermined transfer speed after the transfer speed of the digital data on the receiver side has been switched into the transfer speed which coincides with the predetermined transfer speed.

In order to achieve the above object, according to a fifth aspect of the present invention, there is provided a data receiving method comprising the steps of: switching a transfer speed of digital data on a receiver side into a predetermined transfer speed in compliance with a speed switching command which is transmitted from a transmitter side; informing the transmitter side of an end of switching after the transfer speed of the digital data on the receiver side has been switched into the predetermined transfer speed; and receiving the digital data which are transmitted from the transmitter side at the predetermined transfer speed after the transmitter side has been informed of the end of switching.

In order to achieve the above object, according to a sixth aspect of the present invention, there is provided a data communication method for enabling a receiver side to receive digital data transmitted from a transmitter side, the data communication method on the transmitter side of the digital data, comprising the steps of: switching a transfer speed of digital data on a transmitter side into a predetermined transfer speed; transmitting a speed switching command which makes switch a transfer speed of the digital data on a receiver side into a transfer speed which coincides with the predetermined transfer speed; and transmitting the digital data to the receiver side at the predetermined transfer speed after the transfer speed of the digital data on the receiver side has been switched into the transfer speed which coincides with the predetermined transfer speed; and the data communication method on the receiver side of the digital data, comprising the steps of: switching the transfer speed of the digital data on the receiver side into the predetermined transfer speed in compliance with the speed switching command which is transmitted from the transmitter side; informing the transmitter side of an end of switching after the transfer speed of the digital data on the receiver side has been switched into the predetermined transfer speed; and receiving the digital data which are transmitted from the transmitter side at the predetermined transfer speed after the transmitter side has been informed of the end of switching.

The nature, principle and utility of the invention will become more apparent from the following detailed description when read in conjunction with the accompanying drawings.

DESCRIPTION OF THE PREFERRED EMBODIMENTS

A data transmitter, a data receiver, a data communication system, a data transmitting method, a data receiving method and a data communicating method according to embodiments of the present invention will be explained in detail with reference to accompanying drawings hereinbelow.

Figure 1:
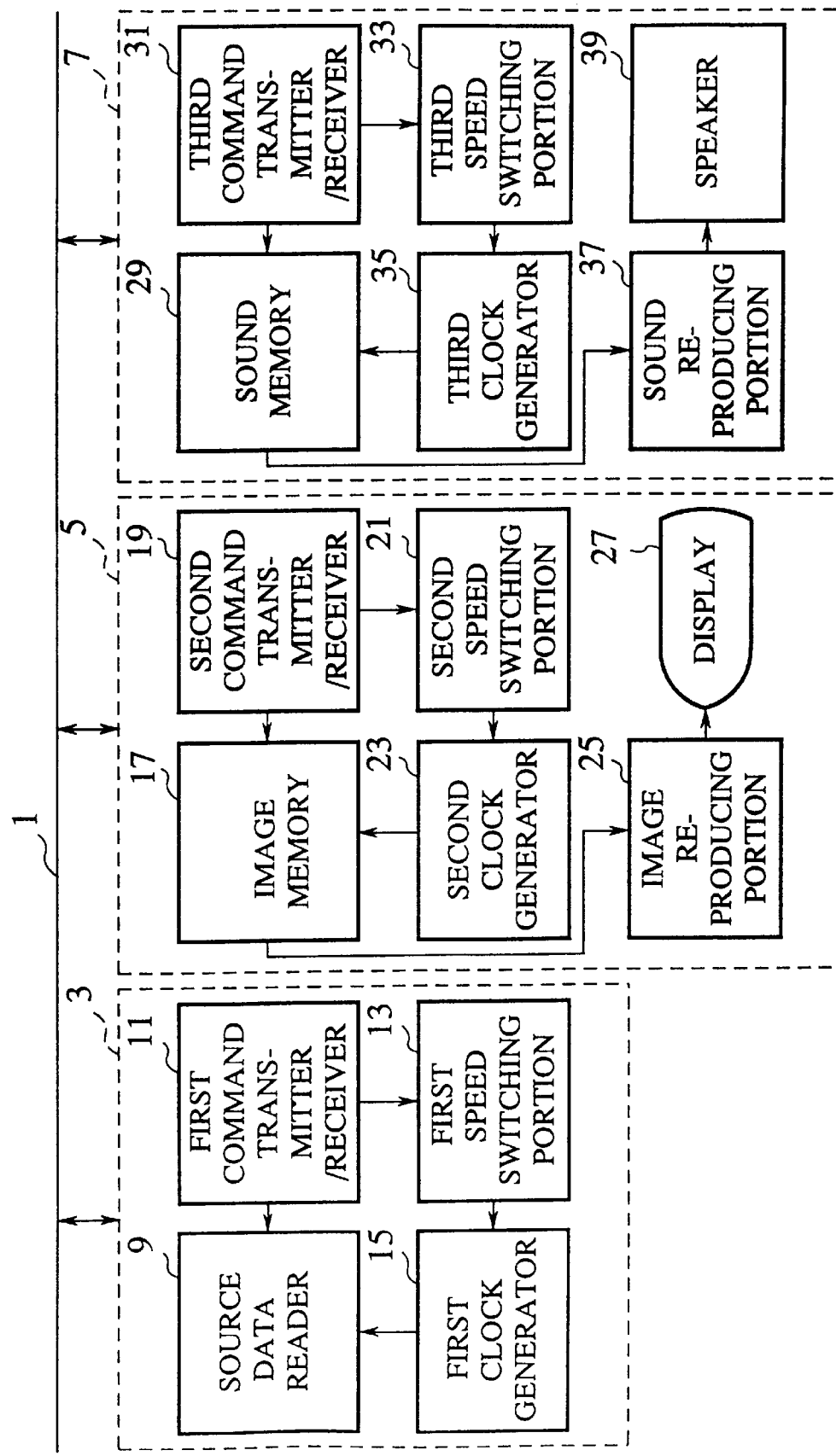
FIG. 1 is a block circuit diagram showing a data communication system according to an embodiment of the present invention.

FIG. 1 is a block circuit diagram showing a data communication system according to an embodiment of the present invention.

As shown in FIG. 1, the data communication system according to the embodiment of the present invention is constructed by connecting a transmitter side apparatus 3 for transmitting digital data to a bus system data transfer line 1, for example, used to transfer the digital data, and receiver side apparatuses 5, 7 for receiving the digital data which are transmitted from the transmitter side apparatus 3.

The transmitter side apparatus 3 has a function of transmitting digital data such as character, sound, image, etc. which are read out from an information storing medium such as CD-ROM, for example, to the receiver side apparatuses 5, 7 at a predetermined data transfer speed. The transmitter side apparatus 3 is constructed to include a first speed switching portion 13 for switching the transfer speed of the digital data on the transmitter side into a predetermined desired transfer speed; a first clock generator 15 for generating a reference clock to accommodate to the predetermined desired transfer speed; a source data reader 9 for reading out source data in the form of digital data at a predetermined data transfer speed in synchronism with this reference clock and then transmitting the read source data to the receiver side apparatuses 5, 7; and a first command transmitter/receiver 11 for transmitting to the receiver side apparatuses 5, 7 a speed switching command which makes second and third speed switching portion 21, 33 switch the digital data transfer speed in the receiver side apparatuses 5, 7 into a transfer speed which coincides with the data transfer speed in the transmitter side apparatus 3 being switched by the first speed switching portion 13, and also receiving a command to the effect that speed switching process has been ended from the receiver side apparatuses 5, 7 respectively when the digital data transfer speeds in the receiver side apparatuses 5, 7 are switched into a transfer speed which coincides with the data transfer speed in the transmitter side apparatus 3.

On the contrary, each of the receiver side apparatuses 5, 7 has a function of receiving the source data in the form of digital data transmitted from the transmitter side apparatus 3 at a transfer speed which coincides with the data transfer speed in the transmitter side apparatus 3.

The receiver side apparatus 5 shown in FIG. 1 is an image reproducing apparatus for receiving image data in the form of digital data and also reproducing images from the received image data. The receiver side apparatus 5 is constructed to include a second speed switching portion 21 for switching data transfer speed in the receiver side apparatus 5 into a predetermined desired transfer speed which coincides with a data transfer speed in the transmitter side apparatus 3; a second clock generator 23 for generating a reference clock to accommodate to the predetermined desired transfer speed; an image memory 17 such as a frame memory for receiving the image data being transmitted from the transmitter side apparatus 3 at a predetermined transfer speed in synchronism with this reference clock and then storing the received image data therein; an image reproducing portion 25 for reading out the image data from the image memory 17 and then reproducing images from the image data; a display 27 for displaying the images which are reproduced by the image reproducing portion 25; and a second command transmitter/receiver 19 for receiving the speed switching command being transmitted from the transmitter side apparatus 3 and also transmitting to the transmitter side apparatus 3 a command to the effect that speed switching process has been ended when the digital data transfer speed in the receiver side apparatus 5 is switched into a transfer speed which coincides with the data transfer speed in the transmitter side apparatus 3.

The receiver side apparatus 7 shown in FIG. 1 is an image reproducing apparatus for receiving sound data in the digital data and reproducing sound from the received sound data. The receiver side apparatus 7 is constructed to include a third speed switching portion 33 for switching the data transfer speed in the receiver side apparatus 7 into a predetermined desired transfer speed which coincides with the data transfer speed in the transmitter side apparatus 3; a third clock generator 35 for generating a reference clock to accommodate to the predetermined desired transfer speed; a sound memory 29 for receiving sound data being transmitted from the transmitter side apparatus 3 at a predetermined data transfer speed in synchronism with the reference clock and then storing the received sound data therein; a sound reproducing portion 37 for reading out sound data from the sound memory 29 and then reproducing sound from the sound data; a speaker 39 for regenerating the sound which is reproduced by the sound reproducing portion 37; and a third command transmitter/receiver 31 for receiving the speed switching command being transmitted from the transmitter side apparatus 3 and also transmitting to the transmitter side apparatus 3 a command to the effect that speed switching process has been ended when the digital data transfer speed in the receiver side apparatus 7 is switched into a transfer speed which coincides with the data transfer speed in the transmitter side apparatus 3.

Figure 2:
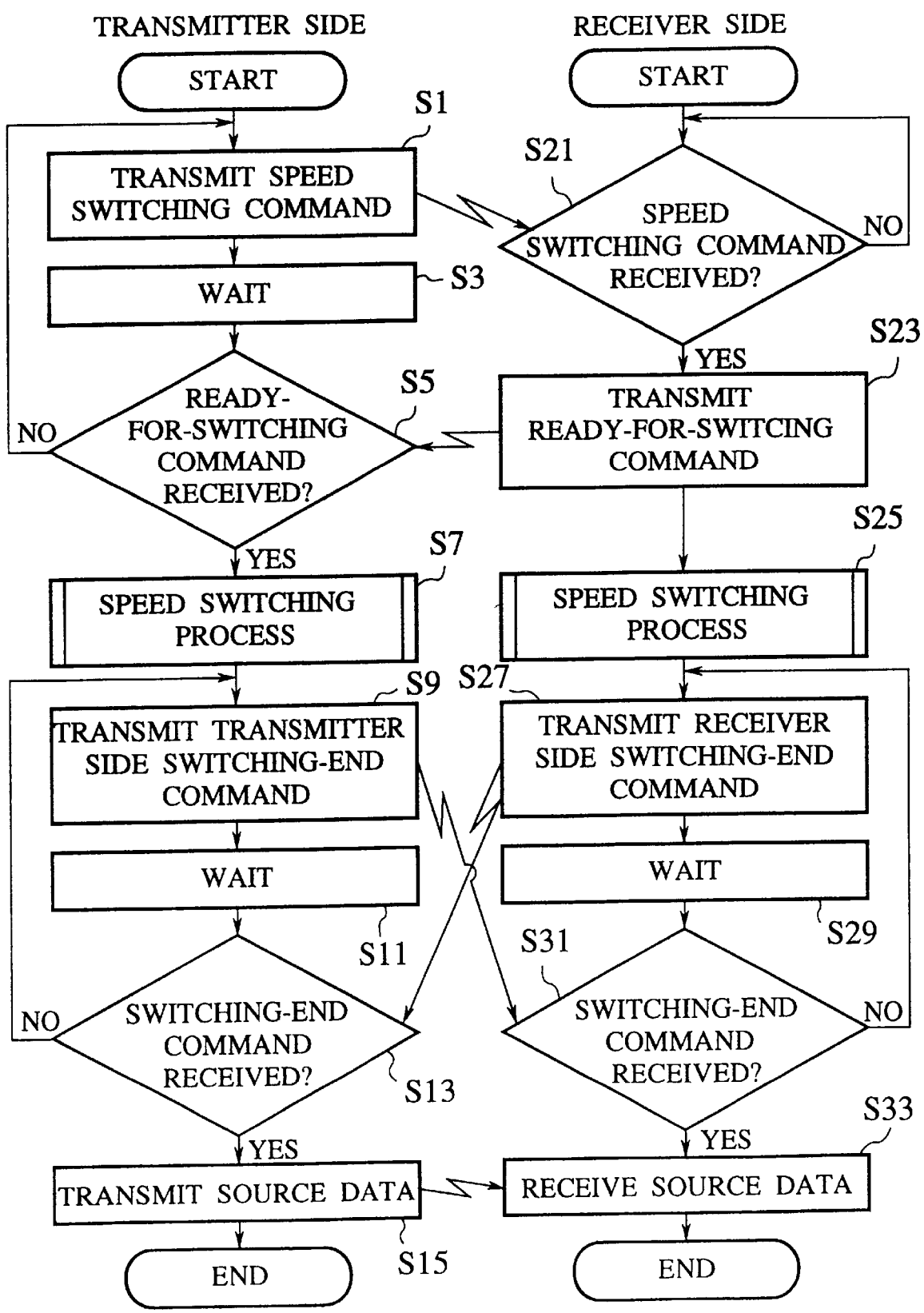
FIG. 2 is a flowchart illustrating an operation of the data communication system according to the embodiment of the present invention.
Figure 3:
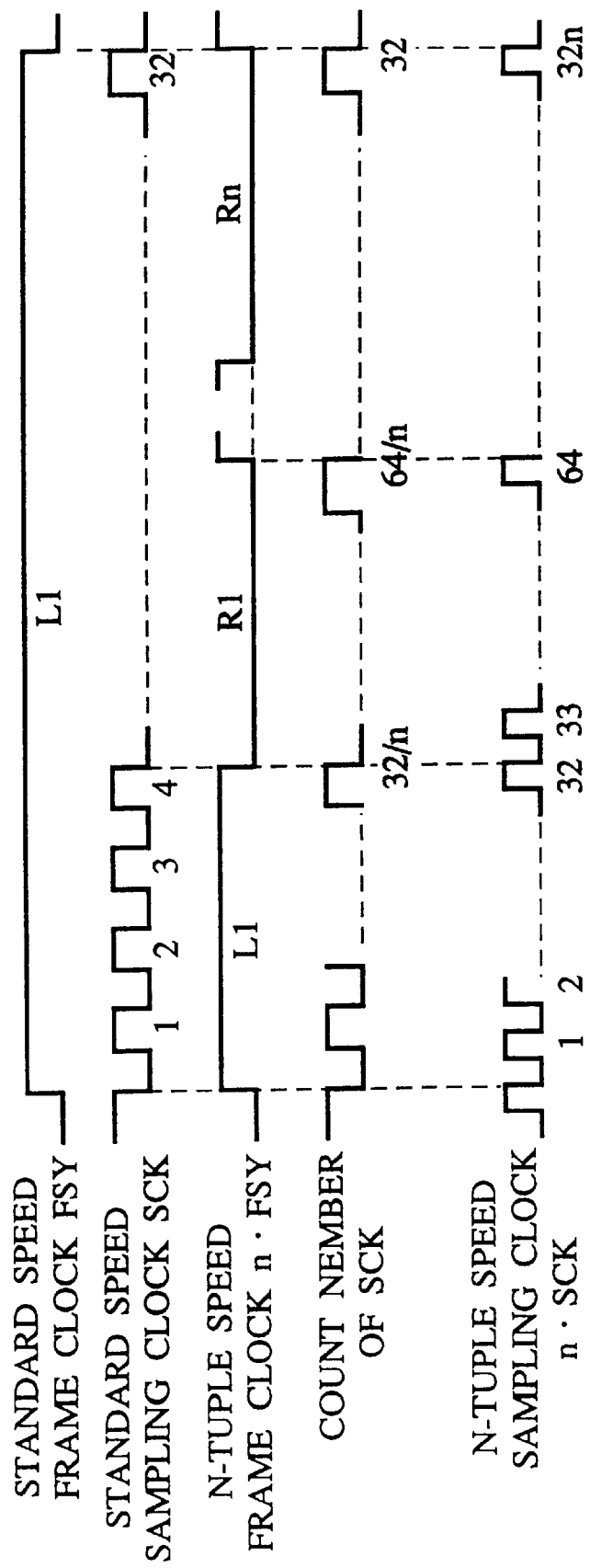
FIG. 3 is a timing chart explaining the operation of the data communication system according to the embodiment of the present invention.
Figure 4:
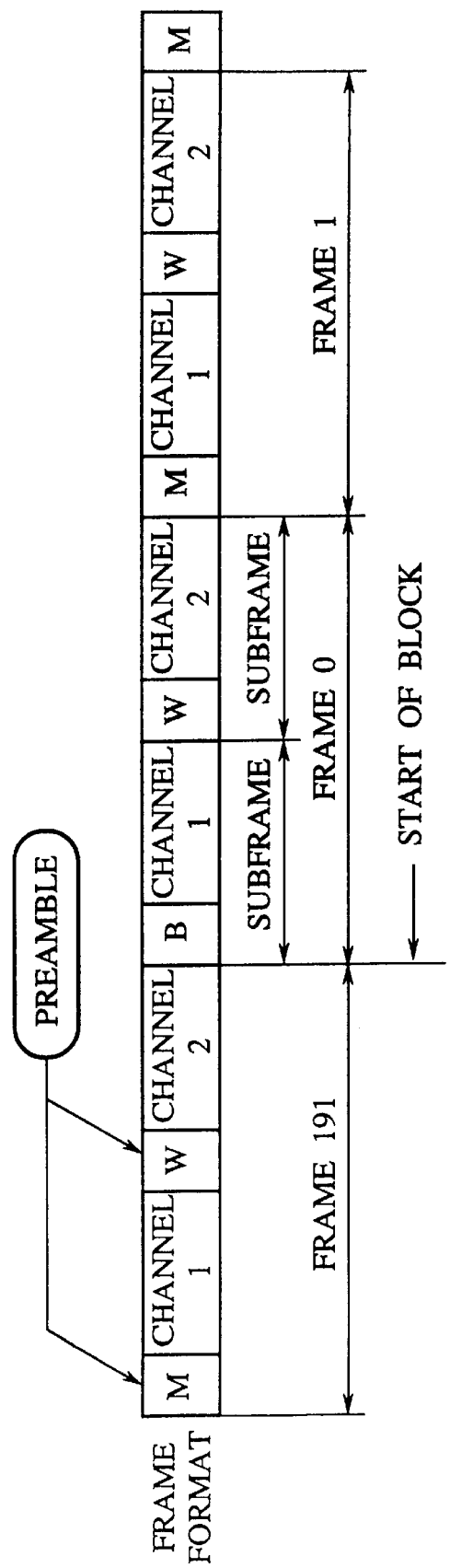
FIG. 4 is a view showing a frame format to explain the operation of the data communication system according to the embodiment of the present invention.
Figure 5:
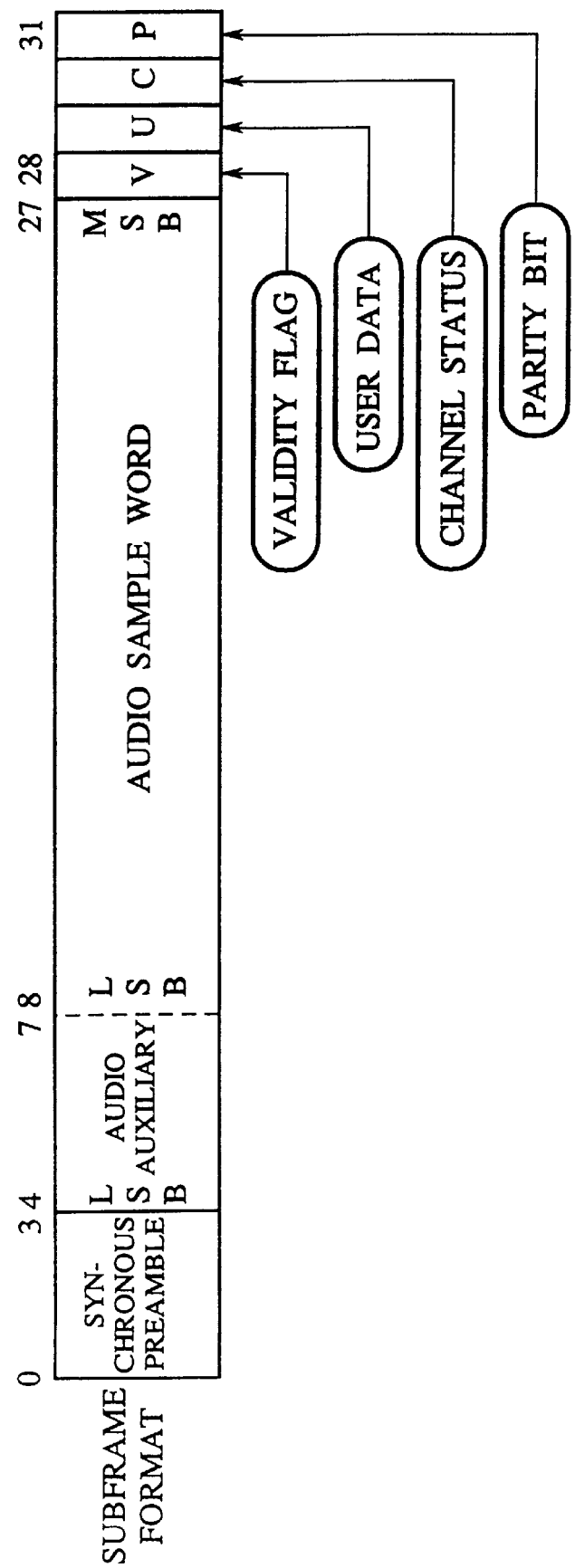
FIG. 5 is a view showing a subframe format to explain the operation of the data communication system according to the embodiment of the present invention.

Operations of the data transmitter, the data receiver, and the data communication system constructed as above according to the present invention will be explained along with a flowchart shown in FIG. 2 while referring to FIGS. 1 and 3 hereunder. Since contents of the operations of the data transmitter and the data receiver are included in the operation of the data communication system, their explanation will be omitted. In addition, audio data having a frame structure shown in FIG. 4 and a subframe structure shown in FIG. 5 are illustrated as the digital data which are transferred from the transmitter side apparatus to the receiver side apparatus, and there will be explained hereunder the case where audio data are transmitted from the transmitter side apparatus 3 to the receiver side apparatus 7.

In the transmitter side apparatus 3, first the first command transmitter/receiver 11 transmits to the receiver side apparatus 7 a speed switching command which renders to switch the digital data transfer speed in the receiver side apparatus 7 into a transfer speed which coincides with the data transfer speed in the transmitter side apparatus 3 (step S1). The transmitter side apparatus 3 then continues to wait a ready-for-switching command transmitted from the receiver side apparatus 7 for a predetermined time after it has transmitted the speed switching command (step S3). The transmitter side apparatus 3 then determines whether or not the ready-for-switching command has been received by the transmitter side apparatus 3 (step S5). Where the "ready-for-switching command" is defined as a command to the effect that the receiver side apparatus 7 is now capable of switching the digital data transfer speed into a transfer speed which coincides with the data transfer speed in the transmitter side apparatus 3. Unless, as the result of reception determination in step S5, the first command transmitter/receiver 11 has received the ready-for-switching command, then the process returns to step S1 and the processes in steps S1 to S5 are executed repeatedly until the first command transmitter/receiver 11 receives the ready-for-switching command from the receiver side apparatus 7. Conversely, if it has been determined that the ready-for-switching command is received by the transmitter side apparatus 3, then the first speed switching portion 13 carries out a speed switching process in which the data transfer speed in the transmitter side apparatus 3 is switched into a data transfer speed peculiar to such digital data (step S7).

On the contrary, in the receiver side apparatus 7, first the third command transmitter/receiver 31 determines whether or not the speed switching command has been received from the transmitter side apparatus 3 (step 21). Unless the third command transmitter/receiver 31 has received the speed switching command, then it continues to execute this reception determining process until it receives the speed switching command. If it has been determined, as the result of reception determination in step S21, that the third command transmitter/receiver 31 received the speed switching command, then the third command transmitter/receiver 31 transmits the ready-for-switching command to the transmitter side apparatus 3 (step S23). After the ready-for-switching command has been transmitted to the transmitter side apparatus 3, the third speed switching portion 33 then executes a speed switching process in which the data transfer speed in the receiver side apparatus 7 is switched into a transfer speed in compliance with the speed switching command (step S25).

Returning to the process in the transmitter side apparatus 3 again, after the speed switching process has been completed, the first command transmitter/receiver 11 then transmits a transmitter side switching-end command to the receiver side apparatus 7 (step S9). Where the "transmitter side switching-end command" is defined as a command indicating the effect that the digital data transfer speed in the transmitter side apparatus 3 has been switched into a data transfer speed peculiar to such digital data. After the first command transmitter/receiver 11 has transmitted the transmitter side switching-end command, it then continues to wait a receiver side switching-end command to be transmitted from the receiver side apparatus 7 for a predetermined time (step S11). The first command transmitter/receiver 11 then determines whether or not the receiver side switching-end command transmitted from the receiver side apparatus 7 has been received (step S13). Unless the first command transmitter/receiver 11 has received the receiver side switching-end command as the result of this reception determination, then the process returns to step S9 and the processes in steps S9 to S13 are executed repeatedly until the first command transmitter/receiver 11 receives the receiver side switching-end command transmitted from the receiver side apparatus 7. On the contrary, it has been determined that the first command transmitter/receiver 11 received the receiver side switching-end command, then the source data reader 9 executes a process in which source data are transmitted at a data transfer speed peculiar to such digital data (step S15).

Then, in the receiver side apparatus 7, after the speed switching process has been completed, the third command transmitter/receiver 31 then transmits a receiver side switching-end command to the transmitter side apparatus 3 (step S27). Where the "receiver side switching-end command" is defined as a command to the effect that the digital data transfer speed in the receiver side apparatus 7 has been switched into a data transfer speed peculiar to such digital data. After the third command transmitter/receiver 31 has transmitted the receiver side switching-end command, it then continues to wait the transmitter side switching-end command to be transmitted from the transmitter side apparatus 3 for a predetermined time (step S29). The third command transmitter/receiver 31 then determines whether or not the transmitter side switching-end command transmitted from the transmitter side apparatus 3 has been received (step S31). Unless the third command transmitter/receiver 31 has received the transmitter side switching-end command as the result of this reception determination, then the process returns to step S27 and the processes in steps S27 to S31 are executed repeatedly until the third command transmitter/receiver 31 receives the transmitter side switching-end command transmitted from the transmitter side apparatus 3. On the contrary, it has been determined that the third command transmitter/receiver 31 received the transmitter side switching-end command, then the source data which have been transmitted at a data transfer speed peculiar to such digital data are written in sequence into the sound memory 29 (step S33).

The operation of the above data communication system according to the embodiment of the present invention will be explained in more detail with reference to a timing chart shown in FIG. 3 hereunder. In FIG. 3, in the digital audio interface signal which constitutes one frame of 64 bits in terms of right and left two channel subframes in combination as shown in FIG. 4 and is standardized according to the CEI/IEC-958, mutual synchronized relationships among a standard speed frame clock FSY, a standard speed sampling clock SCK, an n-tuple speed frame clock n·FSY (where n is an integer), and an n-tuple speed sampling clock n·SCK are illustrated. For instance, if the sound data in the form of the digital data are transmitted from the transmitter side apparatus 3 to the receiver side apparatus 7 at the n-tuple speed, at first the sound data are read out in synchronism with the n-tuple speed sampling clock n·SCK in the transmitter side 3 and then the sound data are transmitted to the receiver side apparatus 7 at the transfer speed in synchronism with the n-tuple speed frame clock n·FSY. In the meanwhile, in the receiver side apparatus 7, the third command transmitter/receiver 31 receives the sound data at the transfer speed in synchronism with the n-tuple speed frame clock n·FSY and then the sound data are stored into the sound memory 29 in synchronism with the n-tuple speed sampling clock n·SCK. As shown in FIG. 3, the tuple speed mode information can be transmitted from the transmitter side apparatus 3 to the receiver side apparatus 7 by transmitting the n-tuple speed frame clock n·FSY together with the pulse count number of the standard speed sampling clock SCK, which is included within one period of the n-tuple speed frame clock n·FSY, from the transmitter side apparatus 3 to the receiver side apparatus 7. In addition, as shown in FIG. 5, for example, the above tuple speed mode information may be written into a user data area U which the user can use freely. Sender information, destination information, etc. as well as tuple speed mode information may be written into the user data area U. Hence, the digital data can be transmitted surely to a predetermined sender.

As explained above, according to the present invention, after the data transfer speeds in the transmitter side apparatus and the receiver side apparatus have been mated with each other, the digital data such as character, sound, image, etc. stored in the information storing medium such as the CD-ROM can be transmitted surely from the transmitter side apparatus to the receiver side apparatus.

The present invention should be interpreted not to be limited to the above embodiment, and therefore other embodiments of the present invention can be implemented by making appropriate variations or modifications to the present invention.

More particularly, the embodiment of the present invention has been explained, for example, with illustrating the normalized digital audio interface signal in which one frame of 64 bits is constructed by providing subframes made up of right and left two channels in combination. However, the present invention is not limited to such embodiment and, for example, the bit number to be included in one frame may be changed into suitable bit number arbitrarily. For instance, one frame may be composed of 48 bits.

In addition, although the tuple speed mode information have been written into the user data area U in the embodiment of the present invention, the present invention is not limited to such embodiment. For instance, another embodiment of the present invention may be adopted wherein the speed switching command including the tuple speed mode information, to which a preamble indicating the speed switching command is added, is written into an audio sample word area of the subframe if there exists no source data to be transferred during the speed switching process, etc.

Finally, the case where the digital data are transferred to be accommodated to the n-tuple speed mode of the CD-ROM drive has been explained in the embodiment of the present invention, but the present invention is not limited to such embodiment. It is needless to say that the present invention may be accommodated to every device to accelerate the higher data transfer speed such as a DVD (Digital Video Disc) player, a DAT (Digital Audio Taperecorder), etc.

What is claimed is:

1. A data transmitter comprising:

transmitter side speed switching means for switching a transfer speed of digital data on a transmitter side into a predetermined transfer speed;

data transmitting means for transmitting the digital data at the predetermined transfer speed; and speed switching command transmitting means for transmitting to a receiver side a speed switching command which makes switch a transfer speed of the digital data on the receiver side into a transfer speed which coincides with the predetermined transfer speed, wherein the data transmitting means transmits the digital data to the receiver side at the predetermined transfer speed after the transfer speed of the digital data on the receiver side has been switched into the transfer speed which coincides with the predetermined transfer speed, wherein the data transmitting means transmits the digital data as audio data based on CEI/IEC-958 standard in which one frame of 64 bits is constructed by two subframes made up of right and left channels, and wherein the speed switching command transmitting means writes the speed switching command into user data areas in the subframes made up of right and left channels, and then transmits the subframes to the receiver side.

2. A data transmitter according to claim 1, wherein the speed switching command transmitting means receives, from the receiver side, speed switching-end information informing that the transfer speed of the digital data on the receiver side has been switched into the transfer speed which coincides with the predetermined transfer speed.

3. A data transmitter according to claim 1, wherein the data transmitting means transmits the digital data via a bus system data transfer line.

4. A data receiver comprising:
receiver side speed switching means for switching a transfer speed of digital data on a receiver side into a predetermined transfer speed in compliance with a speed switching command which is transmitted from a transmitter side;
data receiving means for receiving the digital data at the predetermined transfer speed which has been switched by the receiver side speed switching means; and
speed switching-end informing means for informing the transmitter side of an end of switching after the transfer speed of the digital data on the receiver side has been switched into the predetermined transfer speed in compliance with the speed switching command by the receiver side speed switching means,
wherein the data receiving means receives the digital data which are transmitted from the transmitter side at the predetermined transfer speed after the speed switching-end informing means has informed the transmitter side of the end of switching,
wherein the data receiving means receives the digital data as audio data based on CEI/IEC-958 standard in which one frame of 64 bits is constructed by two subframes made up of right and left channels, and
wherein the receiver side speed switching means switches the transfer speed of the digital data on the receiver side into the predetermined transfer speed in compliance with the speed switching command which is written into user data areas in the subframes made up of right and left channels.

5. A data receiver according to claim 4, wherein the data receiving means receives the digital data via a bus system data transfer line.

6. A data communication system comprising:
transmitter side speed switching means for switching a transfer speed of digital data on a transmitter side into a predetermined transfer speed;
data transmitting means for transmitting the digital data at the predetermined transfer speed;
speed switching command transmitting means for transmitting to a receiver side a speed switching command which makes switch a transfer speed of the digital data on the receiver side into a transfer speed which coincides with the predetermined transfer speed;
receiver side speed switching means for switching the transfer speed of the digital data on the receiver side into the predetermined transfer speed in compliance with the speed switching commend which is transmitted by the speed switching command transmitting means;
data receiving means for receiving the digital data at the predetermined transfer speed which has been switched by the receiver side speed switching means; and
speed switching-end informing means for informing the transmitter side of an end of switching after the transfer speed of the digital data on the receiver side has been switched into the predetermined transfer speed in compliance with the speed switching command by the receiver side speed switching means,
wherein the data transmitting means transmits the digital data to the receiver side at the predetermined transfer speed after the transfer speed of the digital data on the receiver side has been switched into the transfer speed which coincides with the predetermined transfer speed,
wherein the data receiving means receives the digital data which are transmitted from the transmitter side at the predetermined transfer speed after the speed switching-end informing means has informed the transmitter side of the end of switching,
wherein the data transmitting means and the data receiving means transmits and receives respectively the digital data as audio data based on CEI/IEC-958 standard in which one frame of 64 bits is constructed by two subframes made up of right and left channels, and
wherein the speed switching command transmitting means writes the speed switching command into user data areas in the subframes made up of right and left two channels and then transmits the subframes to the receiver side, and the receiver side speed switching means switches the transfer speed of the digital data on the receiver side into the predetermined transfer speed in compliance with the speed switching command which is written into the user data areas.

7. A data communication system according to claim 6, wherein the data transmitting means and the data receiving means transmits and receives the digital data via a bus system data transfer line respectively.

8. A data transmitting method comprising the steps of:
switching a transfer speed of digital data on a transmitter side into a predetermined transfer speed;
transmitting a speed switching command which makes switch a transfer speed of the digital data on a receiver side into a transfer speed which coincides with the predetermined transfer speed;
transmitting the digital data to the receiver side at the predetermined transfer speed after the transfer speed of the digital data on the receiver side has been switched into the transfer speed which coincides with the predetermined transfer speed; and
transmitting the digital data as audio data based on CEI/IEC-958 standard in which one frame of 64 bits is constructed by two subframes made up of right and left channels,
wherein the speed switching command transmitting step writes the speed switching command into user data areas in the subframes made up of right and left channels, and then transmits the subframes to the receiver side.

9. A data receiving method comprising the steps of:
switching a transfer speed of digital data on a receiver side into a predetermined transfer speed in compliance with a speed switching command which is transmitted from a transmitter side;
informing the transmitter side of an end of switching after the transfer speed of the digital data on the receiver side has been switched into the predetermined transfer speed; and
receiving the digital data which are transmitted from the transmitter side at the predetermined transfer speed after the transmitter side has been informed of the end of switching,
wherein the data receiving step receives the digital data as audio data based on CEI/IEC-958 standard in which one frame of 64 bits is constructed by two subframes made up of right and left channels, and
wherein the switching step switches the transfer speed of the digital data on the receiver side into the predetermined transfer speed in compliance with the speed switching command which is written into user data areas in the subframes made up of right and left channels.

10. In a data communication method for enabling a receiver side to receive digital data transmitted from a transmitter side, the data communication method on the transmitter side of the digital data, comprising the steps of:

switching a transfer speed of digital data on a transmitter side into a predetermined transfer speed;

transmitting a speed switching command which makes switch a transfer speed of the digital data on a receiver side into a transfer speed which coincides with the predetermined transfer speed; and transmitting the digital data to the receiver side at the predetermined transfer speed after the transfer speed of the digital data on the receiver side has been switched into the transfer speed which coincides with the predetermined transfer speed; and the data communication method on the receiver side of the digital data, comprising the steps of:

switching the transfer speed of the digital data on the receiver side into the predetermined transfer speed in compliance with the speed switching command which is transmitted from the transmitter side;

informing the transmitter side of an end of switching after the transfer speed of the digital data on the receiver side has been switched into the predetermined transfer speed; and receiving the digital data which are transmitted from the transmitter side at the predetermined transfer speed after the transmitter side has been informed of the end of switching, wherein the transmitted and received digital data comprises audio data based on CEI/IEC-958 standard in which one frame of 64 bits is constructed by two subframes made up of right and left channels, and wherein the speed switching command transmitting step writes the speed switching command into user data areas in the subframes made up of right and left channels and then transmits the subframes to the receiver side, and the switching step switches the transfer speed of the digital data on the receiver side into the predetermined transfer speed in compliance with the speed switching command which is written into the user data areas.

11. A data transmitter comprising:

a transmitter side speed switch configured to switch a transfer speed of digital data on a transmitter side into a predetermined transfer speed;

a data transmitter configured to transmit the digital data at the predetermined transfer speed; and a speed switching command transmitting mechanism configured to transmit to a receiver side a speed switching command which makes switch a transfer speed of the digital data on the receiver side into a transfer speed which coincides with the predetermined transfer speed, wherein the data transmitter transmits the digital data to the receiver side at the predetermined transfer speed after the transfer speed of the digital data on the receiver side has been switched into the transfer speed which coincides with the predetermined transfer speed, wherein the data transmitter transmits the digital data as audio data based on CEI/IEC-958 standard in which one frame of 64 bits is constructed by two subframes made up of right and left channels, and wherein the speed switching command transmitting mechanism writes the speed switching command into user data areas in the subframes made up of right and left two channels, and then transmits the subframes to the receiver side.

12. A data transmitter according to claim 11, wherein the speed switching command transmitting mechanism receives, from the receiver side, speed switching-end information informing that the transfer speed of the digital data on the receiver side has been switched into the transfer speed which coincides with the predetermined transfer speed.

13. A data transmitter according to claim 11, wherein the data transmitter transmits the digital data via a bus system data transfer line.

14. A data receiver comprising:

a receiver side speed switch configured to switch a transfer speed of digital data on a receiver side into a predetermined transfer speed in compliance with a speed switching command transmitted from a transmitter side;

a data receiver configured to receive the digital data at the predetermined transfer speed which has been switched by the receiver side speed switch; and a speed switching-end informing mechanism configured to inform the transmitter side of an end of switching after the transfer speed of the digital data on the receiver side has been switched into the predetermined transfer speed in compliance with the speed switching command by the receiver side speed switch, wherein the data receiver receives the digital data transmitted from the transmitter side at the predetermined transfer speed after the speed switching-end informing mechanism has informed the transmitter side of the end of switching, wherein the data receiver receives the digital data as audio data based on CEI/IEC-958 standard in which one frame of 64 bits is constructed by two subframes made up of right and left channels, and wherein the receiver side speed switch switches the transfer speed of the digital data on the receiver side into the predetermined transfer speed in compliance with the speed switching command written into user data areas in the subframes made up of right and left two channels.

15. A data receiver according to claim 14, wherein the data receiver receives the digital data via a bus system data transfer line.

16. A data communication system comprising:

a transmitter side speed switch configured to switch a transfer speed of digital data on a transmitter side into a predetermined transfer speed;

a data transmitter configured to transmit the digital data at the predetermined transfer speed;

a speed switching command transmitting mechanism configured to transmit to a receiver side a speed switching command which makes switch a transfer speed of the digital data on the receiver side into a transfer speed which coincides with the predetermined transfer speed;

a receiver side speed switch configured to switch the transfer speed of the digital data on the receiver side into the predetermined transfer speed in compliance with the speed switching command transmitted by the speed switching command transmitting mechanism;

a data receiver configured to receive the digital data at the predetermined transfer speed which has been switched by the receiver side speed switch; and a speed switching-end informing mechanism configured to inform the transmitter side of an end of switching after the transfer speed of the digital data on the receiver side has been switched into the predetermined transfer speed in compliance with the speed switching command by the receiver side speed switch, wherein the data transmitter transmits the digital data to the receiver side at the predetermined transfer speed after the transfer speed of the digital data on the receiver side has been switched into the transfer speed which coincides with the predetermined transfer speed, and wherein the data receiver receives the digital data transmitted from the transmitter side at the predetermined transfer speed after the speed switching-end informing mechanism has informed the transmitter side of the end of switching, wherein the data transmitter and the data receiver transmits and receives respectively the digital data as audio data based on CEI/IEC-958 standard in which one frame of 64 bits is constructed by two subframes made up of right and left channels, and wherein the speed switching command transmitting mechanism writes the speed switching command into user data areas in the subframes made up of right and left channels and then transmits the subframes to the receiver side, and the receiver side speed switch switches the transfer speed of the digital data on the receiver side into the predetermined transfer speed in compliance with the speed switching command written into the user data areas.

17. A data communication system according to claim 16, wherein the data transmitter and the data receiver transmits and receives the digital data via a bus system data transfer line respectively.

18. A data transmitter comprising:

a transmitter side speed switch configured to switch a transfer speed of digital data on a transmitter side into a predetermined transfer speed;

a data transmitter configured to transmit the digital data at the predetermined transfer speed; and a speed switching command transmitting mechanism configured to transmit to a receiver side a speed switching command which makes switch a transfer speed of the digital data on the receiver side into a transfer speed which coincides with the predetermined transfer speed, wherein the data transmitter transmits the digital data to the receiver side at the predetermined transfer speed after the transfer speed of the digital data on the receiver side has been switched into the transfer speed which coincides with the predetermined transfer speed, wherein the speed switching command transmitting mechanism writes the speed switching command into a subframe of the data.

19. A data receiver comprising:

a receiver side speed switch configured to switch a transfer speed of digital data on a receiver side into a predetermined transfer speed in compliance with a speed switching command transmitted from a transmitter side;

a data receiver configured to receive the digital data at the predetermined transfer speed which has been switched by the receiver side speed switch; and a speed switching-end informing mechanism configured to inform the transmitter side of an end of switching after the transfer speed of the digital data on the receiver side has been switched into the predetermined transfer speed in compliance with the speed switching command by the receiver side speed switch, wherein the data receiver receives the digital data transmitted from the transmitter side at the predetermined transfer speed after the speed switching-end informing mechanism has informed the transmitter side of the end of switching, wherein the receiver side speed switch switches the transfer speed of the digital data on the receiver side into the predetermined transfer speed in compliance with the speed switching command written into a subframe of the data.

20. A data communication system comprising:

a transmitter side speed switch configured to switch a transfer speed of digital data on a transmitter side into a predetermined transfer speed;

a data transmitter configured to transmit the digital data at the predetermined transfer speed;

a speed switching command transmitting mechanism configured to transmit to a receiver side a speed switching command which makes switch a transfer speed of the digital data on the receiver side into a transfer speed which coincides with the predetermined transfer speed;

a receiver side speed switch configured to switch the transfer speed of the digital data on the receiver side into the predetermined transfer speed in compliance with the speed switching command transmitted by the speed switching command transmitting mechanism;

a data receiver configured to receive the digital data at the predetermined transfer speed which has been switched by the receiver side speed switch; and a speed switching-end informing mechanism configured to inform the transmitter side of an end of switching after the transfer speed of the digital data on the receiver side has been switched into the predetermined transfer speed in compliance with the speed switching command by the receiver side speed switch;

wherein the data transmitter transmits the digital data to the receiver side at the predetermined transfer speed after the transfer speed of the digital data on the receiver side has been switched into the transfer speed which coincides with the predetermined transfer speed, and wherein the data receiver receives the digital data transmitted from the transmitter side at the predetermined transfer speed after the speed switching-end informing mechanism has informed the transmitter side of the end of switching, wherein the speed switching command transmitting mechanism writes the speed switching command into a subframe of the data and then transmits the subframes to the receiver side, and the receiver side speed switch switches the transfer speed of the digital data on the receiver side into the predetermined transfer speed in compliance with the speed switching command written into the subframe.

21. A data transmitter according to claim 18, wherein the speed switching command transmitting mechanism writes the speed switching command into one of 1) user data areas in subframes of the data and 2) an audio sample word of the subframe if there exists no source data to be transferred.

22. A data receiver according to claim 19, wherein the speed switching command is written into one of 1) user data areas in subframes of the data and 2) an audio sample word of the subframe if there exists no source data to be transferred.

23. A data communication system according to claim 20, wherein the speed switching command transmitting mechanism writes the speed switching command into one of 1) user data areas in subframes of the data and 2) an audio sample word of the subframe if there exists no source data to be transferred.

* * * * *